(12) United States Patent
Bae et al.

(10) Patent No.: US 12,459,171 B2
(45) Date of Patent: Nov. 4, 2025

(54) PHYSICAL FOAMING PROCESS USING FOAMING PRESS

(71) Applicant: HANWHA SOLUTIONS CORPORATION, Seoul (KR)

(72) Inventors: Seong Soo Bae, Daejeon (KR); Chul Ee Kang, Daejeon (KR); Sang Jin Lee, Daejeon (KR); Jae Hyeok Lee, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 307 days.

(21) Appl. No.: 17/784,149

(22) PCT Filed: Oct. 30, 2020

(86) PCT No.: PCT/KR2020/015086
§ 371 (c)(1),
(2) Date: Jun. 10, 2022

(87) PCT Pub. No.: WO2021/118060
PCT Pub. Date: Jun. 17, 2021

(65) Prior Publication Data
US 2023/0031181 A1 Feb. 2, 2023

(30) Foreign Application Priority Data

Dec. 11, 2019 (KR) .................. 10-2019-0164422

(51) Int. Cl.
*B29C 44/42* (2006.01)
*B29C 44/34* (2006.01)
(Continued)

(52) U.S. Cl.
CPC .......... *B29C 44/42* (2013.01); *B29C 44/3403* (2013.01); *C08J 9/0028* (2013.01);
(Continued)

(58) Field of Classification Search
CPC ..................... B29C 44/42; B29C 44/3403
See application file for complete search history.

(56) References Cited

U.S. PATENT DOCUMENTS

| 4,255,368 A * | 3/1981 | Olabisi | ................ B29C 44/42 |
| | | | 264/DIG. 83 |
| 6,099,949 A * | 8/2000 | Nomura | ............... B29C 44/586 |
| | | | 264/108 |

(Continued)

FOREIGN PATENT DOCUMENTS

| CN | 101612772 A | 12/2009 |
| CN | 102167840 A | 8/2011 |

(Continued)

*Primary Examiner* — Andrew D Graham
(74) *Attorney, Agent, or Firm* — Harvest IP Law, LLP

(57) ABSTRACT

The present invention relates to a method preparing a highly functional foam by a physical foaming process (physical blowing agent-based foaming) used to prepare a midsole of a shoe, and relates to a technology that is environmentally friendly because a chemical foaming agent is not used and is capable of preparing a foam with improved physical properties at a low cost by shortening a processing time. To this end, according to the present invention, a physical foaming process of preparing a foam by using a foaming press provided with a cavity includes: an injecting step of injecting a foaming compounding resin into the cavity; a closing step of closing the cavity by using the foaming press; a gas injecting step of injecting gas into the cavity; an atmospheric pressure maintaining step of dissolving the gas in the foaming compounding resin by maintaining the inside of the cavity at a constant pressure; and a foaming step of performing foaming by opening the cavity so that the inside of the cavity is depressurized.

9 Claims, 3 Drawing Sheets

(51) Int. Cl.
    *C08J 9/00*     (2006.01)
    *B29K 23/00*     (2006.01)

(52) U.S. Cl.
    CPC ..... *B29K 2023/083* (2013.01); *C08J 2203/06* (2013.01); *C08J 2203/08* (2013.01); *C08J 2323/08* (2013.01); *C08J 2331/04* (2013.01)

(56) References Cited

U.S. PATENT DOCUMENTS

| | | | | |
|---|---|---|---|---|
| 8,048,347 | B2* | 11/2011 | Mozer | B29C 44/08 264/51 |
| 2001/0021457 | A1* | 9/2001 | Usui | B29C 44/381 428/515 |
| 2006/0261507 | A1* | 11/2006 | Kobayashi | B29C 44/42 264/53 |
| 2012/0267815 | A1* | 10/2012 | Tokunou | B29C 45/34 425/546 |
| 2014/0252669 | A1* | 9/2014 | Turng | B29C 44/348 264/50 |
| 2016/0221282 | A1* | 8/2016 | Maikisch | B29C 45/14426 |
| 2016/0311486 | A1* | 10/2016 | Yu | B62J 1/22 |
| 2017/0002164 | A1* | 1/2017 | Kohlstrung | C08J 9/105 |
| 2017/0002167 | A1* | 1/2017 | Shimura | B32B 27/304 |
| 2017/0136717 | A1* | 5/2017 | Yoshida | B29C 44/10 |
| 2018/0186962 | A1* | 7/2018 | Shimura | B29C 44/0461 |
| 2018/0194045 | A1* | 7/2018 | Ercoli | C08J 9/32 |
| 2019/0061211 | A1* | 2/2019 | Luo | C08J 9/122 |
| 2019/0099927 | A1* | 4/2019 | Luo | B29C 44/02 |
| 2019/0270228 | A1* | 9/2019 | Luo | C08J 9/122 |

FOREIGN PATENT DOCUMENTS

| | | |
|---|---|---|
| CN | 106584750 A | 4/2017 |
| CN | 108976584 A | 12/2018 |
| CN | 109551701 A | 4/2019 |
| CN | 110142911 A | 8/2019 |
| CN | 110539442 A | 12/2019 |
| CN | 114786904 A | 7/2022 |
| JP | 2017518211 A | 7/2017 |
| KR | 101622710 B1 | 5/2016 |
| KR | 10-2017-0058711 A | 5/2017 |
| KR | 101771653 B1 | 8/2017 |
| KR | 20180034074 A | 4/2018 |

* cited by examiner

(a) Physical Foaming

(b) Chemical Foaming

PHYSICAL FOAMING PROCESS USING FOAMING PRESS

CROSS-REFERENCE TO RELATED APPLICATIONS

This application is a National Stage of International Application No. PCT/KR2020/015086 filed Oct. 30, 2020, claiming priority based on Korean Patent Application No. 10-2019-0164422 filed Dec. 11, 2019, the disclosure of which is incorporated herein by reference in its entirety.

TECHNICAL FIELD

The present invention relates to a method for preparing a highly functional foam by a physical foaming process (physical blowing agent-based foaming) used to prepare an insole, a midsole, and an outsole of a shoe, and relates to a technology that is environmentally friendly because a chemical foaming agent is not used and is capable of preparing a foam with improved physical properties at a low cost by shortening a processing time. In addition, the present invention relates to a process of controlling the physical properties of a foam by injecting a resin composition to be foamed to a cavity installed in a foaming press, dissolving the resin composition by injecting gas, and setting a pressure, a depressurization rate, a temperature, and the like.

BACKGROUND ART

A polymer foaming process may be largely classified into a chemical foaming process and a physical foaming process. The chemical foaming process is used in various fields, including the preparation of elastomer foams such as insoles and midsoles that are cushion materials in the footwear industry, and is the most widely used process because of its simple process and high productivity. The chemical foaming process is performed in the order of kneading a resin and a chemical foaming agent, molding, heating, and foaming. However, in the chemical foaming process, harmful components such as formamide or ammonia are generated in the process of heating and decomposing a chemical foaming agent (JTR—azodicarbon amide) and generating gas. This causes environmental problems, and there is a limitation to comply with eco-friendly regulations.

In order to improve this limitation, a physical foaming process, which is a process of directly injecting and dissolving gas into a resin and then performing foaming has recently been developed in the technical field. Physically foamed products manufactured by the physical foaming process are being applied to expensive running shoes.

The physical foaming process is largely divided into four steps: (a) filling a high-pressure chamber with gas; (b) preparing a single-phase mixture through gas dissolution and saturation in a polymer; (c) generating bubbles in the polymer by inducing thermodynamic instability through heating or depressurization in the mixture; (d) performing foaming.

Here, the method of inducing thermodynamic instability is largely divided into (1) phase separation through heating of the mixture and (2) phase separation through momentary depressurization.

Among them, (1) the foaming process through heating is a 2-step heating foaming process and is currently the most commonly used method among the physical foaming processes. This process is a process of saturating gas in a low-temperature, ultra-high pressure autoclave, taking out after about 48 hours, heating in an oil-bath, and slowly performing foaming. Since this process requires much more time than an existing chemical foaming process and requires expensive equipment such as autoclave, it has a disadvantage that production costs are very high. In addition, in the current physical foaming process, foaming is possible only in the form of sheets and beads. Thus, molding is required through post-processing treatment. Therefore, in order to overcome this disadvantage, (2) a one-step process using phase separation through momentary depressurization is required. As a result of in-depth research, the present invention can propose a physical foaming process that can simplify the process, can shorten the time, and can prepare a foam matching the required physical properties.

(Patent Literature 1) Korean Patent Registration No. 10-1771653

DESCRIPTION OF EMBODIMENTS

Technical Problem

The present invention aims to solve the above-described problems.

An object of the present invention is to provide an eco-friendly, simplified process capable of preparing a foam with improved properties at reduced costs.

An object of the present invention is to control conditions such as pressure, temperature, and the like to prepare a foam with various physical properties as necessary.

Solution to Problem

In order to achieve the above-described objects of the present invention and realize the characteristic effects of the present invention described below, the characteristic configuration of the present invention is as follows.

According to the present invention, a physical foaming process of preparing a foam by using a foaming press provided with a cavity includes: an injecting step of injecting a foaming compounding resin into the cavity; a closing step of closing the cavity by using the foaming press; a gas injecting step of injecting gas into the cavity; an atmospheric pressure maintaining step of dissolving the gas in the foaming compounding resin by maintaining the inside of the cavity at a constant pressure; and a foaming step of performing foaming by opening the cavity so that the inside of the cavity is depressurized.

According to the present invention, in the injecting step, the foaming compounding resin may be injected to occupy 50 to 100% of the volume of the cavity.

According to the present invention, in the closing step, the foaming press may close the cavity with a pressure of 100 to 200 kgf/cm$^2$. In the gas injecting step, the gas may be injected into the cavity so that the cavity is pressurized to a set pressure of 5 to 20 MPa. In the atmospheric pressure maintaining step, the inside of the cavity may be controlled to be maintained at a pressure of 5 to 20 MPa for 1 to 100 minutes.

According to the present invention, the foaming step may perform foaming by depressurizing the cavity through momentary opening, and may demold the foam molded in the form of a chamber at the same time as the foaming.

According to the present invention, the inside of the cavity may be maintained at a temperature of 50 to 200° C., and one gas selected from the group consisting of nitrogen gas, carbon dioxide gas, supercritical carbon dioxide gas, argon gas, and helium gas may be used.

According to the present invention, the foaming compounding resin is in a processed solid form of a sheet or pellet form.

Advantageous Effects of Disclosure

A physical foaming process using a foaming press according to the present invention is environmentally friendly because the physical foaming process does not use a chemical foaming agent, and is capable of preparing a foam with improved physical properties at a low cost by shortening the processing time.

In addition, it is possible to control a cell structure of a foam because it is easy to change processing conditions. Due to this, it is possible to control mechanical properties including split tear strength (STS) and rebound resilience.

BEST MODE

Figure 1:
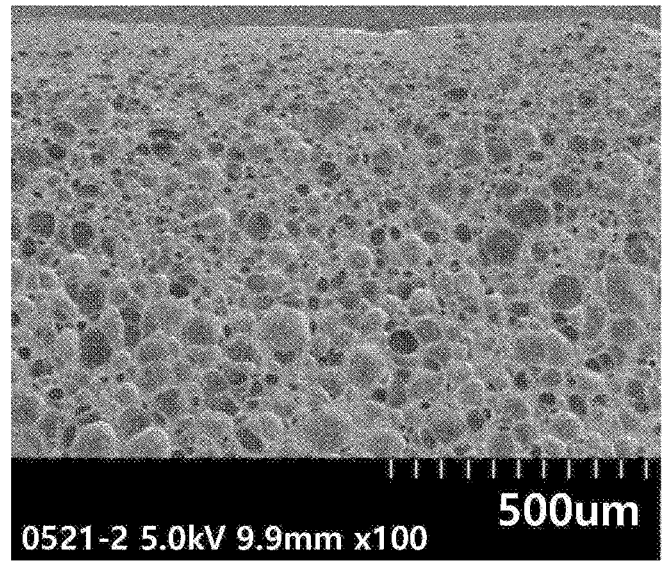
FIG. 1 is an enlarged view showing a foam prepared by physical foaming and a foam prepared by chemical foaming.
Figure 1:
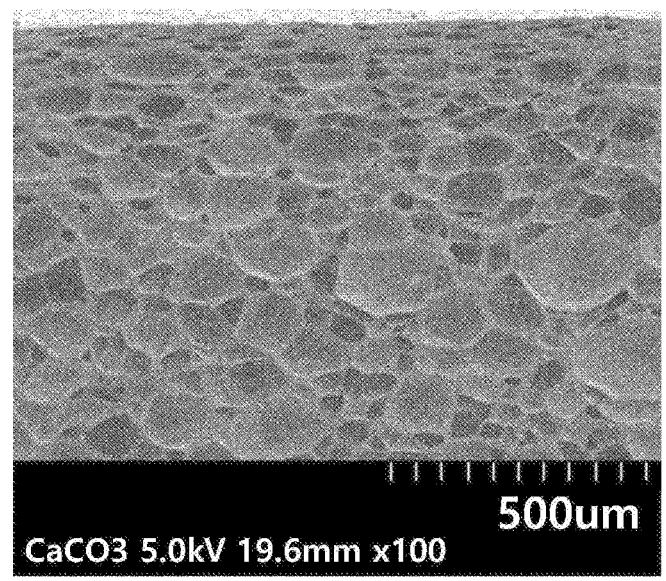

Hereinafter, the structure and operation of the present invention will be described in more detail with reference to preferred examples of the present invention. However, these examples are shown by way of illustration and should not be construed as limiting the present invention in any sense. In addition, matters that can be sufficiently technically inferred by those of ordinary skill in the art without difficulty will be omitted.

EXAMPLE 1

After a nucleating agent ($CaCO_3$, 4 g) and a crosslinking agent (DCP, 0.48 g) was added to 80 g of a foaming compounding resin of a sheet form, the resin was injected into a pressure cavity, and the cavity was closed with a press pressure of 150 kgf/cm$^2$ and was charged with 15 MPa of nitrogen. After that, the resin was saturated with gas at a cavity temperature of 170° C. for 40 minutes, and then the cavity was momentarily opened to prepare a foam.

EXAMPLE 2

The same procedure as in Example 1 was performed except that the temperature of the cavity was controlled to 90° C.

EXAMPLE 3

The same procedure as in Example 1 was performed except that the temperature of the cavity was controlled to 110° C.

EXAMPLE 4

The same procedure as in Example 1 was performed except that the temperature of the cavity was controlled to 130° C.

EXAMPLE 5

The same procedure as in Example 1 was performed except that the temperature of the cavity was controlled to 150° C.

EXAMPLE 6

The same procedure as in Example 1 was performed except that the temperature of the cavity was controlled to 180° C.

EXAMPLE 7

The same procedure as in Example 1 was performed except that the gas saturation time was controlled to 20 minutes.

EXAMPLE 8

The same procedure as in Example 1 was performed except that the gas saturation time was controlled to 30 minutes.

Comparative Example: Chemical Foaming Process

For comparison of physical foaming and chemical foaming under the same conditions, the same types and amounts of additives except for the chemical foaming agent were used and a chemical foaming agent (JTR, 8.32 g) and a foaming aid (ZnO, 2.4 g) were added to prepare samples.

Experimental Example: Physical Property Evaluation

For the foams prepared in Examples and Comparative Examples, physical properties were evaluated as shown in Table 1 below.

TABLE 1

| Items | Evaluation Method |
|---|---|
| STS (Split Tear Strength) | Sample: length 180 mm, width 25 mm, thickness 10 mm<br>UTM Crosshead Speed: 50 mm/min<br>Maximum load value taken when pulling and tearing from both sides after cutting in the center of the cross-section of sample |
| Hardness | Sample: length 180 mm, width 80 mm, thickness 10 mm,<br>Measurement device: Asker C type hardness gauge |
| Foaming ratio | After preparation of foam, horizontal and vertical lengths are measured, and foaming ratio is calculated by averaging increase degree relative to mold |
| Rebound Resilience | Sample: length 180 mm, width 80 mm, thickness 12.5 mm<br>Conditions: Average of values measured 4-6 times after ball drop three times |

The experimental results according to the temperature are shown in Table 2 below.

TABLE 2

| Temperature (° C.) | STS (kgf/cm) | Rebound Resilience (%) | Hardness (Asker C) | Density (g/cc) |
|---|---|---|---|---|
| 90 | — | 51 | 41 | 0.32 |
| 110 | — | 53 | 40 | 0.27 |

TABLE 2-continued

| Temperature (° C.) | STS (kgf/cm) | Rebound Resilience (%) | Hardness (Asker C) | Density (g/cc) |
|---|---|---|---|---|
| 130 | — | 56 | 39 | 0.22 |
| 150 | 2.4 | 61 | 33 | 0.18 |
| 170 | 2.7 | 67 | 32 | 0.17 |
| 180 | 2.5 | 62 | 32 | 0.15 |

The experimental results according to the temperature are shown in Table 3 below.

TABLE 3

| Saturation time (min) | Rebound Resilience (%) | Hardness (Asker C) | Density (g/cc) |
|---|---|---|---|
| 20 | 57 | 32 | 0.20 |
| 30 | 60 | 31 | 0.15 |
| 40 | 62 | 31 | 0.14 |

Figure 2:
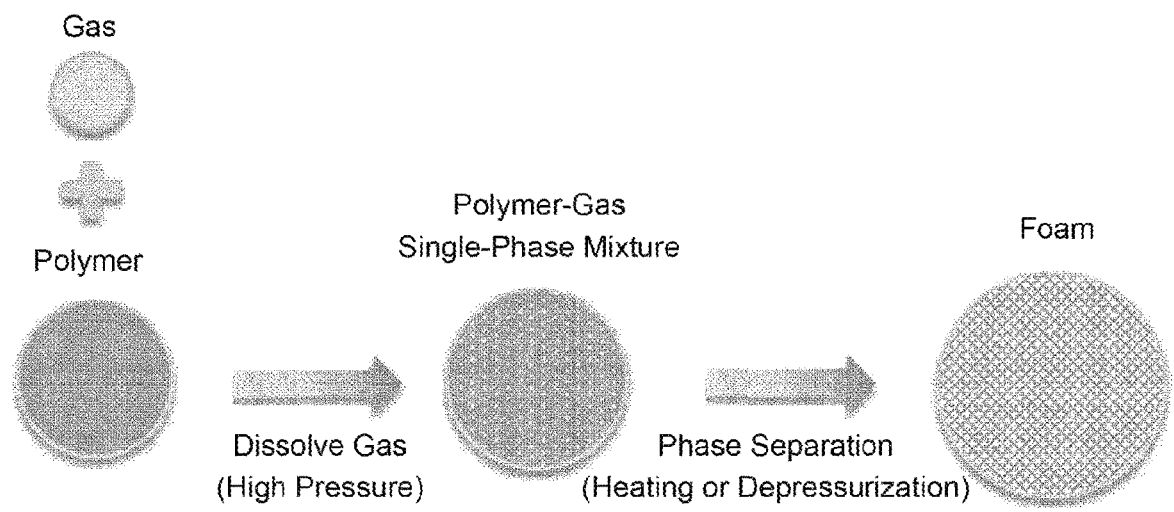
FIG. 2 schematically shows a physical foaming process.

The results of comparative foaming experiments and physical property evaluation between physical foaming and chemical foaming are shown in Table 3 below. (a) of FIG. 1 is an enlarged view showing a foam prepared by physical foaming, and (b) of FIG. 2 is an enlarged view showing a foam prepared by chemical foaming.

TABLE 4

| Type of foaming | Foaming ratio (%) | STS (kgf/cm) | Rebound Resilience (%) | Hardness (Asker C) | Density (g/cc) |
|---|---|---|---|---|---|
| Physical foaming | 130 | 2.4 | 72 | 42 | 0.17 |
| Chemical foaming | 180 | 1.4 | 63 | 32 | 0.14 |

Referring to Table 2 showing the results of the physical property evaluation in Table 1, it can be confirmed that STS and rebound resilience tend to increase until the temperature of the cavity reaches 170° C. and then decrease thereafter, and it can be confirmed that the density decreases with increasing temperature. It can be confirmed that the hardness is closely related to density and the hardness decreases with increasing temperature and converges to 32 at 150° C. That is, as the temperature of the cavity increases, it can be expected that the physical properties of the foam are improved, and it can be expected that the physical properties are the best at 170° C.

Referring to Table 3, it can be confirmed that, as the foaming time increases, the rebound resilience increases and the density decreases. Therefore, in consideration of productivity, it is preferable to set the gas saturation time to about 40 minutes in order to prepare a highly functional, low-specific-gravity, high-elasticity foam.

Referring to Table 4, it can be confirmed that, although the foaming ratio decreased compared to chemical foaming, the STS, rebound resilience, hardness, and density all increased. In particular, it can be confirmed that the STS, rebound resilience, and hardness values are greatly improved.

Therefore, it can be confirmed that the foam with various physical properties can be prepared through the physical foaming process according to the present invention as necessary, and the foam with improved physical properties can be prepared while reducing the required time compared to chemical foaming.

The present invention has been described in detail with reference to the preferred embodiments and the drawings, but the scope of the technical idea of the present invention is not limited to these drawings and embodiments. Accordingly, various modifications or equivalents thereof may fall within the scope of the technical idea of the present invention. Therefore, the scope of the technical idea according to the present invention should be interpreted by the claims, and the technical idea within the equivalents should be interpreted as falling within the scope of the present invention.

MODE OF DISCLOSURE

The inventors can select or define appropriate terms or words to explain the invention. In this case, the terms or words used herein should not be interpreted limitedly to their commonly used meanings, but should be interpreted so as to conform to the technical idea embodied in the invention in consideration of the intention of the inventors.

Accordingly, the terms or words used in the present specification and the claims cannot be regarded as being limited to their commonly used meanings. The contents described above are merely preferred embodiments of the present invention and will not represent or limit all the present technical idea. Examples corresponding to elements and equivalents that can be easily replaced by those of ordinary skill in the art may exist.

Hereinafter, a physical foaming process using a foaming press according to the present invention based on the above-described principle will be described in detail with reference to the drawings.

A polymer foaming process may be largely classified into a chemical foaming process and a physical foaming process. The chemical foaming process is the most widely used process because of its simple process and high productivity. The chemical foaming process is used in various fields such as the preparation of elastomer foam for midsoles of shoes, but there are limitations due to environmental issues.

In response to this, a physical foaming process is being developed. As shown in FIG. 2, the physical foaming process includes: a step of filling a high-pressure chamber with a polymer and a gas; a step of preparing a single-phase mixture by dissolving and saturating the gas in the polymer; a step of causing phase-separation by inducing thermodynamic instability in the mixture to generate air bubbles in the polymer.

Here, the step of inducing thermodynamic instability in the mixture may be classified as a method through heating of the mixture or a method through depressurization.

Among them, the present invention adopts a one-step depressurization foaming process that simultaneously performs foaming and molding. The total processing time (40 to 60 minutes) similar to the existing chemical foaming process is required for preparing a midsole of a shoe, and the processing conditions of the process can be easily changed. In this manner, the physical foaming process capable of controlling the physical properties of the foam is proposed.

In the following specification, two units of pressure, that is, $kgf/cm^2$ and MPa are used. At this time, 1 MPa corresponds to about 10.197162 $kgf/cm^2$.

Figure 3:
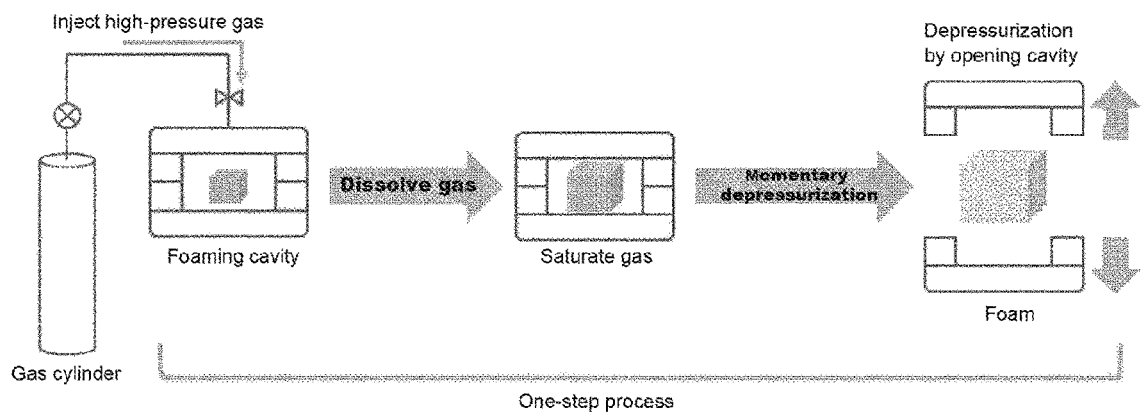
FIG. 3 is a flowchart schematically showing a physical foaming process using a foaming press according to the present invention.

According to an embodiment of the present invention, the physical foaming process using the foaming press may include an injecting step, a closing step, a gas injecting step, an atmospheric pressure maintaining step, and a foaming step, as shown in FIG. 3.

The injecting step is a step of injecting a foaming compounding resin to a cavity. At this time, the injected foaming compounding resin may be a resin including ethylene vinyl acetate (EVA) and an olefin-based elastomer, but is not limited thereto.

Ethylene vinyl acetate (EVA) refers to a polymer obtained by copolymerizing ethylene and vinyl acetate, and the olefin-based elastomer refers to a polymer obtained by copolymerizing ethylene and α-olefin.

Figure 4:
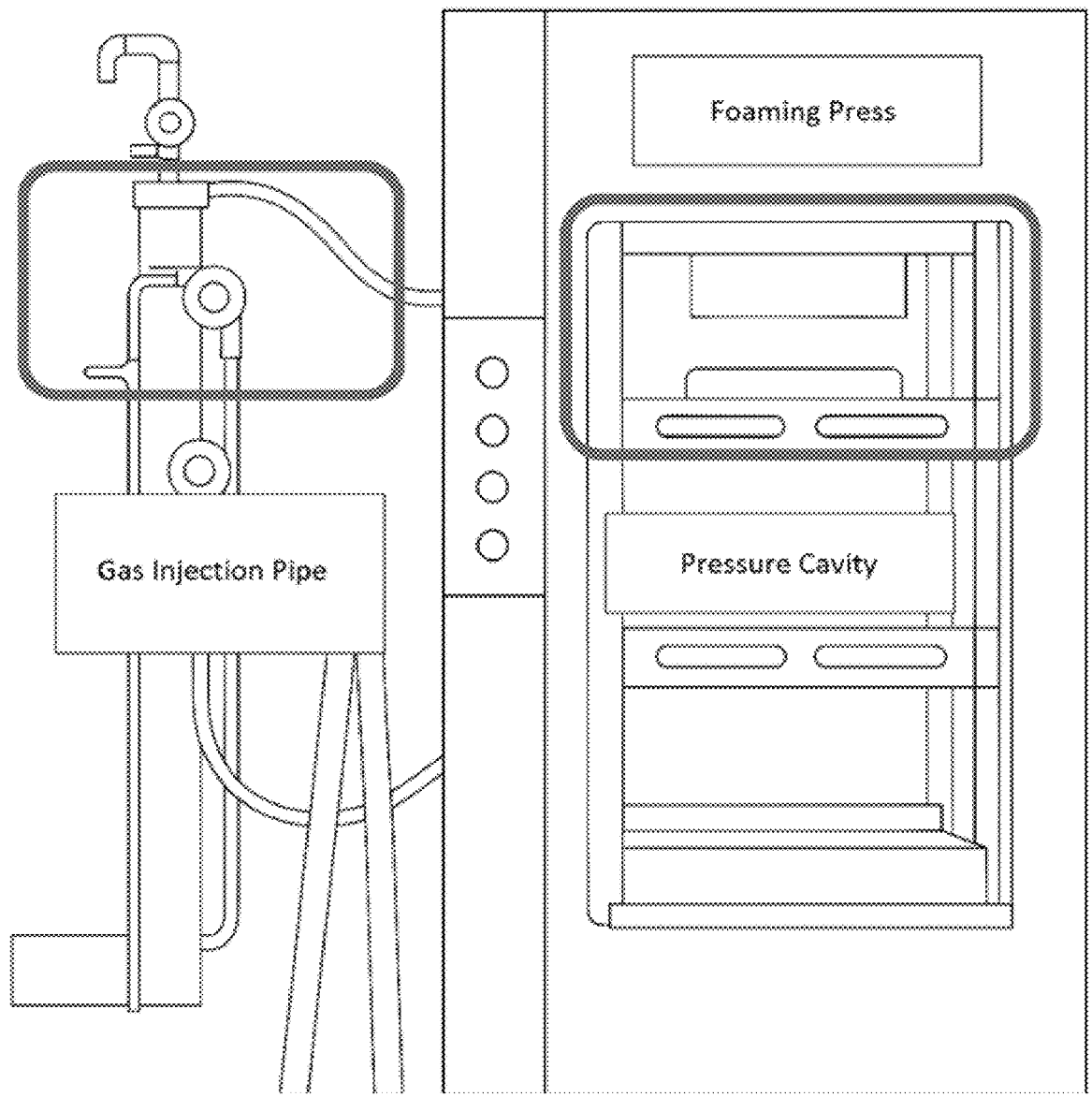
FIG. 4 shows a foaming press provided with a cavity used in the practice of the present invention.

The cavity is also referred to as a mold, and refers to an empty space formed when a mold or the like is assembled or a device in which the empty space is formed. Therefore, the foaming compounding resin may be filled and foamed in the cavity. At this time, the cavity may be mounted on the foaming press, as shown in FIG. 4. According to an embodiment of the present invention, the foaming compounding resin may be in a processed solid form or a powder form, such as a sheet, a pellet, or a preformed body. At this time, the foaming compounding resin may be injected to occupy 50 to 100% of the total volume of the cavity.

The closing step is a step of closing the cavity by using the foaming press. According to an embodiment of the present invention, the foaming press may close the cavity at a pressure of 100 to 200 kgf/cm².

The gas injecting step is a step of injecting gas into the cavity. According to an embodiment of the present invention, the gas may be injected into the cavity so that the cavity is pressurized to a set pressure of 5 to 20 MPa. When pressurized at a pressure of 5 MPa or less, the efficiency of permeation of the injected gas into the foaming compounding resin is reduced. When pressurized to a pressure of 20 MPa or more, the load on the device is increased. In this case, the injected gas may be one selected from the group consisting of nitrogen gas, carbon dioxide gas, supercritical carbon dioxide gas, argon gas, and helium gas.

The atmospheric pressure maintaining step is a step of dissolving the gas in the foaming compounding resin while maintaining the injected gas at a constant pressure. According to an embodiment of the present invention, the inside of the cavity may be maintained at a pressure of 5 to 20 MPa for 1 to 100 minutes. At this time, the total required time of the physical foaming process is dependent on the atmospheric pressure maintaining step. Preferably, the time can be maintained for 30 to 70 minutes so that the processing time similar to that of the existing chemical foaming is required. Compared with the existing physical foaming process (heating method) that induces thermodynamic Instability by heating, the heating method saturates the gas, takes out the foaming compounding resin after about 48 hours, and slowly performs foaming by heating the foaming compounding resin. Therefore, it can be seen that the physical foaming process according to the present invention significantly improves time efficiency.

The foaming step is a step of performing foaming by opening the cavity so that the inside of the cavity is depressurized. When the cavity is momentarily opened, the pressurized gas is released, atmospheric pressure acts on the cavity, and thermodynamic instability is induced. The vaporization of the gas immersed in the foaming compounding resin may be triggered to expand and foam the foaming compounding resin.

In addition, according to an embodiment of the present invention, the foaming step is accompanied by a process of the foaming is performed and at the same time a process of demolding the foam molded in the form of a chamber at the same time as the foaming. As described above, when the foaming and the molding are performed simultaneously in one-step, the molding through post-processing may not be necessary, which is preferable. At this time, the shape of the foam may be formed to correspond to the shape of the inner space of the cavity.

According to an embodiment of the present invention, the cavity may be maintained at a temperature of 50 to 200° C., and preferably 90 to 180° C.

According to an embodiment of the present invention, the cell size of the foam during the foaming process may be controlled to 5 μm to 1 mm. As shown in (a) of FIG. 1, when the physical foaming process according to the present invention is performed, the cell size can be controlled. For example, the maximum cell size can be controlled to 40 μm.

The invention claimed is:

1. A physical foaming process of preparing a foam by using a foaming press provided with a cavity, the physical foaming process comprising:
an injecting step of injecting a foaming compounding resin into the cavity;
a closing step of closing the cavity by using the foaming press;
a gas injecting step of injecting gas into the cavity;
an atmospheric pressure maintaining step of dissolving the gas in the foaming compounding resin by maintaining the inside of the cavity at a constant pressure;
a rapid-opening and demolding step, simultaneously performed in a single action, of (i) rapidly opening the cavity at a speed sufficient to cause an abrupt pressure drop inside the cavity to perform foaming and (ii) removing the foam molded in the form of a chamber, wherein a temperature inside the cavity is 90 to 180° C.

2. The physical foaming process of claim 1, wherein, in the injecting step, the foaming compounding resin is injected to occupy 50 to 100% of the volume of the cavity.

3. The physical foaming process of claim 1, wherein, in the closing step, the foaming press closes the cavity with a pressure of 100 to 200 kgf/cm².

4. The physical foaming process of claim 1, wherein, in the gas injecting step, the gas is injected into the cavity so that the cavity is pressurized to a set pressure of 5 to 20 MPa.

5. The physical foaming process of claim 1, wherein, in the atmospheric pressure maintaining step, the inside of the cavity is maintained at a pressure of 5 to 20 MPa.

6. The physical foaming process of claim 1, wherein the atmospheric pressure maintaining step is maintained for 1 to 100 minutes.

7. The physical foaming process of claim 1, wherein the gas includes one selected from the group consisting of nitrogen gas, carbon dioxide gas, supercritical carbon dioxide gas, argon gas, and helium gas.

8. The physical foaming process of claim 1, wherein the foaming compounding resin is in a solid form.

9. The physical foaming process of claim 8, wherein the foaming compounding resin is in a solid form of a sheet or pellet form.

* * * * *